(12) United States Patent
Moriyama

(10) Patent No.: US 12,009,664 B2
(45) Date of Patent: Jun. 11, 2024

(54) POWER MANAGEMENT SYSTEM AND POWER MANAGEMENT METHOD

(71) Applicant: KYOCERA CORPORATION, Kyoto (JP)

(72) Inventor: Yuichi Moriyama, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 107 days.

(21) Appl. No.: 17/763,639

(22) PCT Filed: Sep. 17, 2020

(86) PCT No.: PCT/JP2020/035271
§ 371 (c)(1),
(2) Date: Mar. 24, 2022

(87) PCT Pub. No.: WO2021/060143
PCT Pub. Date: Apr. 1, 2021

(65) Prior Publication Data
US 2022/0337065 A1 Oct. 20, 2022

(30) Foreign Application Priority Data
Sep. 26, 2019 (JP) ................................. 2019-175737

(51) Int. Cl.
*H02J 3/38* (2006.01)
*G06Q 50/06* (2012.01)
(Continued)

(52) U.S. Cl.
CPC .............. *H02J 3/381* (2013.01); *G06Q 50/06* (2013.01); *H02J 2300/22* (2020.01);
(Continued)

(58) Field of Classification Search
CPC .. G06Q 50/06; H02J 3/38; H02J 3/381; H02J 2300/20; H02J 2300/22; H02J 2300/24;
(Continued)

(56) References Cited

U.S. PATENT DOCUMENTS

2008/0272934 A1* 11/2008 Wang ................ H02J 13/00024
340/870.11
2012/0059775 A1* 3/2012 Oh .......................... G06Q 50/06
702/45
(Continued)

FOREIGN PATENT DOCUMENTS

JP 2005182399 A 7/2005
JP 2018129044 A 8/2018
(Continued)

*Primary Examiner* — Levi Gannon
(74) *Attorney, Agent, or Firm* — HAUPTMAN HAM, LLP (57) ABSTRACT

A power management system includes a facility including an adjustment power supply to which feed-in tariff is applied. The power management system includes an equipment management apparatus that manages the adjustment power supply, and a power management server that manages a reverse power flow output from the facility to a power grid. The equipment management apparatus includes a transmitter transmitting, to the power management server, a message including an information element with which an expiration timing of a period to which the feed-in tariff is applied is allowed to be specified.

6 Claims, 7 Drawing Sheets

(51) Int. Cl.
    *H04L 41/50*    (2022.01)
    *H04L 43/065*   (2022.01)

(52) U.S. Cl.
    CPC ....... *H02J 2300/30* (2020.01); *H04L 41/5029* (2013.01); *H04L 43/065* (2013.01)

(58) Field of Classification Search
    CPC ... H02J 2300/28; H02J 2300/30; Y04S 10/12; Y04S 10/123
    See application file for complete search history.

(56) References Cited

U.S. PATENT DOCUMENTS

| | | | |
|---|---|---|---|
| 2013/0158735 A1* | 6/2013 | Happ | G06Q 50/06 700/295 |
| 2014/0052305 A1* | 2/2014 | Kearns | G06Q 50/06 700/295 |
| 2016/0141873 A1* | 5/2016 | Ellice-Flint | H02J 3/32 307/20 |
| 2019/0348838 A1* | 11/2019 | Liu | H02J 7/0068 |

FOREIGN PATENT DOCUMENTS

| | | |
|---|---|---|
| JP | 2019017154 A | 1/2019 |
| JP | 2019030149 A | 2/2019 |

\* cited by examiner

| EQUIPMENT ID | INSTALLATION DATE | REMOVAL DATE | UPDATE DATE | MAINTENANCE DATE (SCHEDULED DATE) | EQUIPMENT CERTIFICATION DATE | EQUIPMENT CERTIFICATION CAPACITY | FIT END DATE | FIT FLAG | OPERATING STATE | OWNER |
|---|---|---|---|---|---|---|---|---|---|---|
| SOLAR CELL APPARATUS | yy/mm/dd | | yy/mm/dd | yy/mm/dd | yy/mm/dd | AAA | yy/mm/dd | 1 | PPP | XXX |
| POWER STORAGE APPARATUS | yy/mm/dd | | yy/mm/dd | yy/mm/dd | yy/mm/dd | BBB | - | 0 | QQQ | YYY |
| FUEL CELL APPARATUS | yy/mm/dd | | yy/mm/dd | yy/mm/dd | yy/mm/dd | CCC | - | 0 | RRR | ZZZ |
| ... | ... | ... | ... | ... | ... | ... | ... | ... | ... | ... |

POWER MANAGEMENT SYSTEM AND POWER MANAGEMENT METHOD

RELATED APPLICATIONS

The present application is a National Phase of International Application Number PCT/JP2020/035271 filed Sep. 17, 2020 and claims priority of Japanese Application Number 2019-175737 filed Sep. 26, 2019.

TECHNICAL FIELD

The present disclosure relates to a power management system and a power management method.

BACKGROUND ART

An equipment management system that manages various information on a plurality of pieces of equipment is known. Examples of the various information include basic information and maintenance information on the plurality of pieces of equipment. For example, the basic information includes an installation date, a predetermined service life, a rated power consumption, and the like. The maintenance information includes a maintenance history of the equipment (for example, Patent Document 1).

In recent years, a distributed power supply (a solar cell apparatus, a wind power generation apparatus, or the like) that outputs power using natural energy has attracted attention due to increased environmental awareness. In order to promote the spread of such a distributed power supply, the feed-in tariff (FIT) is also known in which output power of the distributed power supply (reverse power flow output from a facility to a power grid) is purchased at a fixed price.

In such a case, assuming that a period to which the feed-in tariff is applied expires, it may be difficult to predict fluctuation of the reverse power flow output from each facility. Specifically, it is necessary to note user behavior in which the output power of the distributed power supply is consumed in the facility without outputting the output power of the distributed power supply as the reverse power flow.

However, since the above-described equipment management system merely targets the maintenance of the equipment, such an equipment management system cannot cope with the above-described situation.

CITATION LIST

Patent Literature

Patent Document 1: JP 2005-182399 A

SUMMARY

A power management system according to a first aspect includes a facility including an adjustment power supply to which the feed-in tariff is applied. The power management system includes an equipment management apparatus that manages the adjustment power supply, and a power management server that manages a reverse power flow output from the facility to a power grid. The equipment management apparatus includes a transmitter transmitting, to the power management server, a message including an information element with which an expiration timing of a period to which the feed-in tariff is applied is allowed to be specified.

A power management method according to a second aspect is a method used in a power management system including a facility including an adjustment power supply to which the feed-in tariff is applied. The power management method includes transmitting, by an equipment management apparatus that manages the adjustment power supply, to a power management server that manages the reverse power flow output from the facility to the power grid, a message including an information element with which an expiration timing of a period to which the feed-in tariff is applied is allowed to be specified.

DESCRIPTION OF EMBODIMENTS

Embodiments will be described below with reference to the drawings. Note that in the following description of the drawings, the same or similar components will be denoted by the same or similar reference signs. However, the drawings are schematic.

Embodiment

Power Management System A power management system according to an embodiment will be described below.

Figure 1:
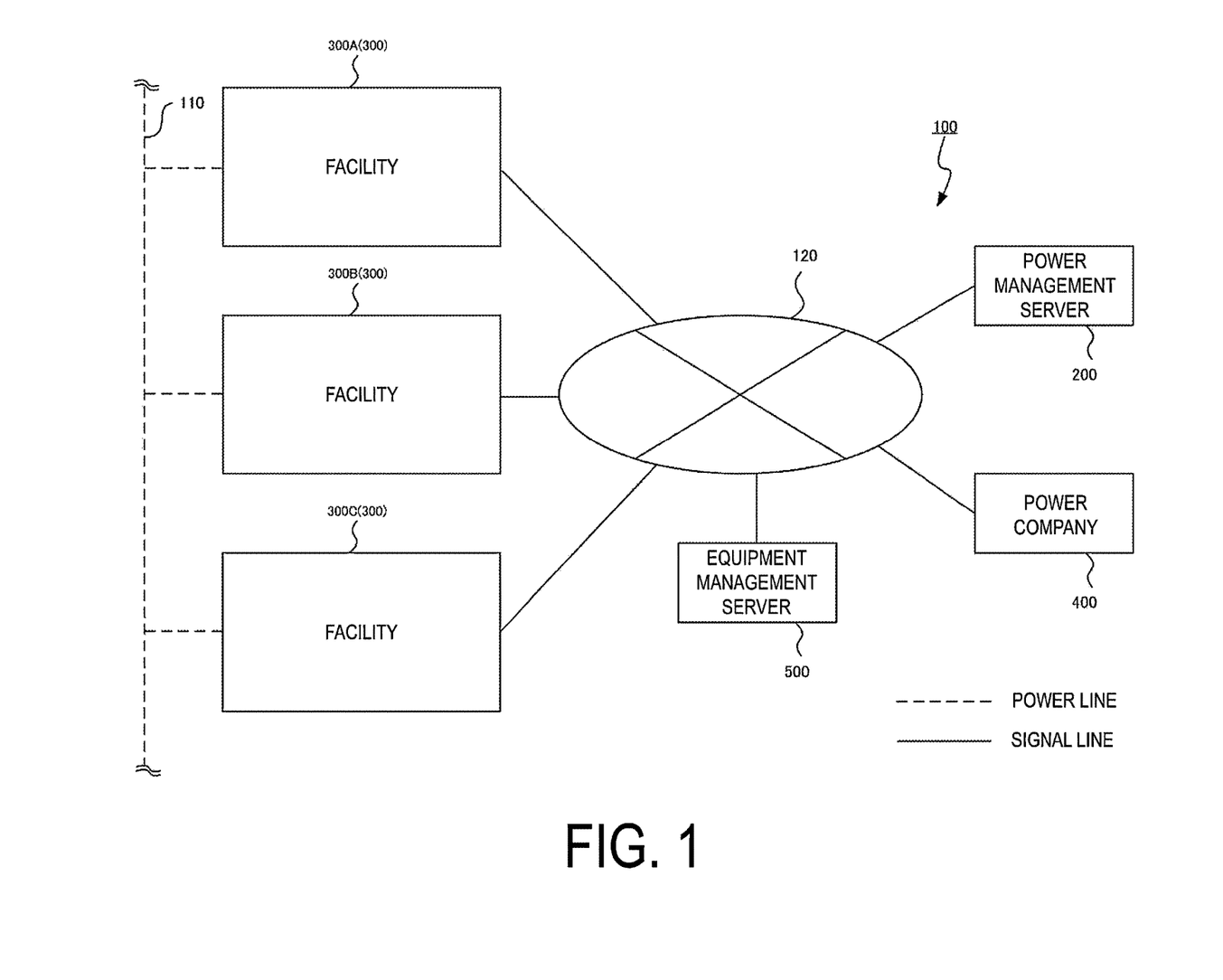
FIG. 1 is a diagram illustrating a power management system 100 according to an embodiment.

As illustrated in FIG. 1, a power management system 100 includes a power management server 200, a facility 300, a power company 400, and an equipment management server 500. In FIG. 1, facilities 300A to 300C are illustrated as examples of the facility 300.

Each facility 300 is connected to a power grid 110. In the following description, the flow of power from the power grid 110 to the facility 300 is referred to as a power flow, and the flow of power from the facility 300 to the power grid 110 is referred to as a reverse power flow.

The power management server 200, the facility 300, and the power company 400 are connected to a network 120. The network 120 may provide lines between these entities. For example, the network 120 is the Internet. The network 120 may include a dedicated line such as a virtual private network (VPN).

The power management server 200 is a sever managed by a business operator, such as a power generation operator, a power transmission and distribution operator, a retailer, or a resource aggregator. The resource aggregator is an electric power provider that provides the reverse power flow to the power generation operator, the power transmission/distribution operator, the retailer, or the like in a virtual power plant (VPP). In the present embodiment, the business operator managing the power management server 200 is an example of an entity that purchases the reverse power flow.

The power management server 200 transmits, to the local controller 360 provided in the facility 300, a control message instructing control of a distributed power supply (for example, a solar cell apparatus 310, a power storage apparatus 320, or a fuel cell apparatus 330) provided in the facility 300. For example, the power management server 200 may transmit a power flow control message (for example, demand response (DR)) requesting control of the power flow and may transmit a reverse power flow control message requesting control of the reverse power flow. Further, the power management server 200 may transmit a power control message for controlling an operating state of the distributed power supply. The degree of control of the power flow or the reverse power flow may be expressed by an absolute value (for example, XX kW), or may be expressed by a relative value (for example, XX %). Alternatively, the degree of control of the power flow or the reverse power flow may be expressed in two or more levels. The degree of control of the power flow or the reverse power flow may be represented by a power charge (RTP: real time pricing) determined by the current power supply and demand balance, and may be represented by a power charge (TOU: time of use) determined by the past power supply and demand balance.

Figure 2:
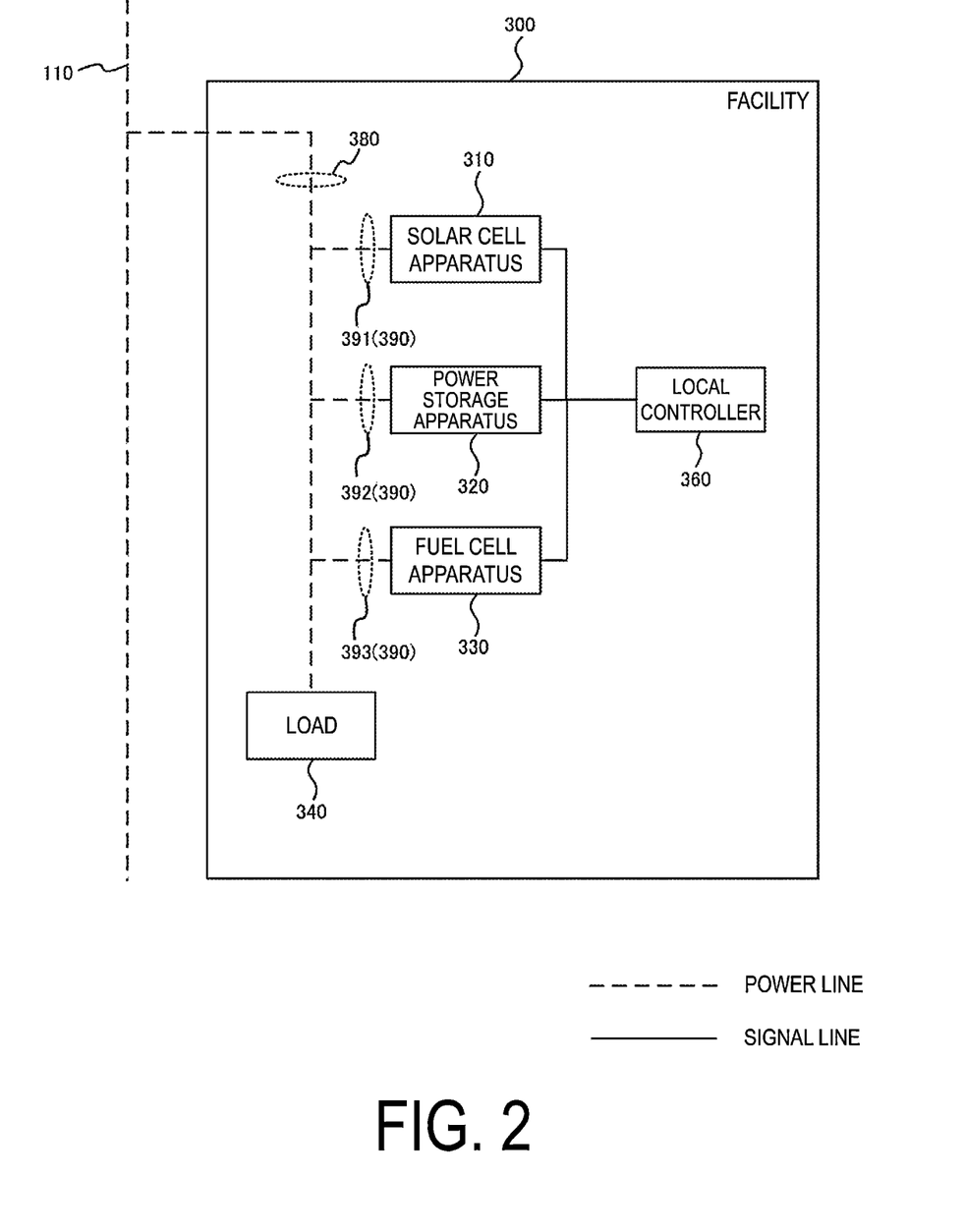
FIG. 2 is a diagram illustrating a facility 300 according to the embodiment.

The facility 300 includes the solar cell apparatus 310, the power storage apparatus 320, the fuel cell apparatus 330, the load device 340, the local controller 360, a power meter 380, and power meters 390, as illustrated in FIG. 2.

The solar cell apparatus 310 is the distributed power supply that generates power in response to sunlight or other light. The solar cell apparatus 310 may be an example of the distributed power supply to which the feed-in tariff (FIT) is applied. For example, the solar cell apparatus 310 includes a power conditioning system (PCS) and a solar panel.

Here, the power output from the solar cell apparatus 310 may vary depending on the amount of received light such as sunlight. Thus, when considering power generation efficiency of the solar cell apparatus 310, the power output from the solar cell apparatus 310 is variable power that is variable according to the amount of received light of the solar panel.

The power storage apparatus 320 is the distributed power supply that charges the power and discharges the power. The power storage apparatus 320 may be an example of the distributed power supply to which the feed-in tariff is not applied. For example, the power storage apparatus 320 includes the PCS and a power storage cell.

The fuel cell apparatus 330 is the distributed power supply that generates power using a fuel. The fuel cell apparatus 330 may be an example of the distributed power supply to which the feed-in tariff is not applied. For example, the fuel cell apparatus 330 includes the PCS and the fuel cell.

For example, the fuel cell apparatus 330 may be a solid oxide fuel cell (SOFC), a polymer electrolyte fuel cell (PEFC), a phosphoric acid fuel cell (PAFC), and a molten carbonate fuel cell (MCFC).

In the embodiment, the solar cell apparatus 310, the power storage apparatus 320, and the fuel cell apparatus 330 may be adjustment power supplies used for the VPP. The adjustment power supply is a power supply that contributes to the VPP among the distributed power supplies provided in the facility 300.

The load device 340 is a device that consumes power. For example, the load device 304 is an air conditioning device, an illumination device, an audio visual (AV) device, or the like.

The local controller 360 is an apparatus (EMS: Energy Management System) that manages power of the facility 300. The local controller 360 may control an operating state of the solar cell apparatus 310, may control an operating state of the power storage apparatus 320 provided in the facility 300, and may control an operating state of the fuel cell apparatus 330 provided in the facility 300. The details of the local controller 360 will be described later (see FIG. 4).

In the embodiment, communication between the power management server 200 and the local controller 360 is performed in accordance with a first protocol. On the other hand, communication between the local controller 360 and the distributed power supply (the solar cell apparatus 310, the power storage apparatus 320, or the fuel cell apparatus 330) is performed in accordance with a second protocol different from the first protocol. For example, as the first protocol, a protocol based on open automated demand response (ADR) or a unique dedicated protocol can be used. For example, as the second protocol, a protocol compliant with ECHONET Lite, smart energy profile (SEP) 2.0, KNX, or a unique dedicated protocol can be used. Note that the first protocol and the second protocol may be different from each other, and, for example, even if both are the unique dedicated protocols, the first protocol and the second protocol may be protocols made of different rules.

The power meter 380 is an example of a base power meter that measures the power flow from the power grid 110 to the facility 300 and the reverse power flow from the facility 300 to the power grid 110. For example, the power meter 380 is a smart meter that belongs to the power company 400.

Here, the power meter 380 transmits, for each predetermined period (for example, 30 minutes), a message including an information element indicating an integrated value of the power flow or the reverse power flow in the predetermined period to the local controller 360. The power meter 380 may autonomously transmit the message and may transmit the message in response to a request of the local controller 360. The power meter 380 may transmit, for each predetermined period, the message including the information element indicating the power flow or the reverse power flow in the predetermined period to the power management server 200.

The power meter 390 is an example of the individual power meter that measures individual output power of the adjustment power supply. The power meter 390 may be provided at an output end of the PCS of the adjustment power supply, and may be considered to be part of the adjustment power supply. In FIG. 2, a power meter 391, a power meter 392, and a power meter 393 are provided as each of the power meters 390. The power meter 391 measures the individual output power of the solar cell apparatus 310. The power meter 392 measures the individual output power of the power storage apparatus 320. The power meter 393 measures the individual output power of the fuel cell apparatus 330.

Here, the power meter 390 transmits the message including information element indicating the individual output power of the adjustment power supply at an interval (for example, 1 minute) shorter than the predetermined period to the local controller 360. The individual output power of the adjustment power supply may be represented by an instantaneous value and may be represented by an integrated value. The power meters 390 may autonomously transmit the message and may transmit the message in response to a request of the local controller 360.

Returning to FIG. 1, the power company 400 is an entity that provides infrastructure such as the power grid 110, and is, for example, the power generation operator or the power transmission/distribution operator. The power company 400 may entrust various operations to an entity managing the power management server 200.

The equipment management server 500 is an example of an equipment management apparatus that manages equipment (for example, an adjustment power supply) provided in the facility 300. The equipment management server 500 manages a state of the equipment and may be used to determine whether maintenance of the equipment is required. For example, the maintenance includes an inspection for investigating a deterioration state of the equipment, a maintenance with a minor care during the inspection, a repair of an equipment failure, a replacement for replacing an existing equipment to a new equipment.

Power Management Server

Figure 3:
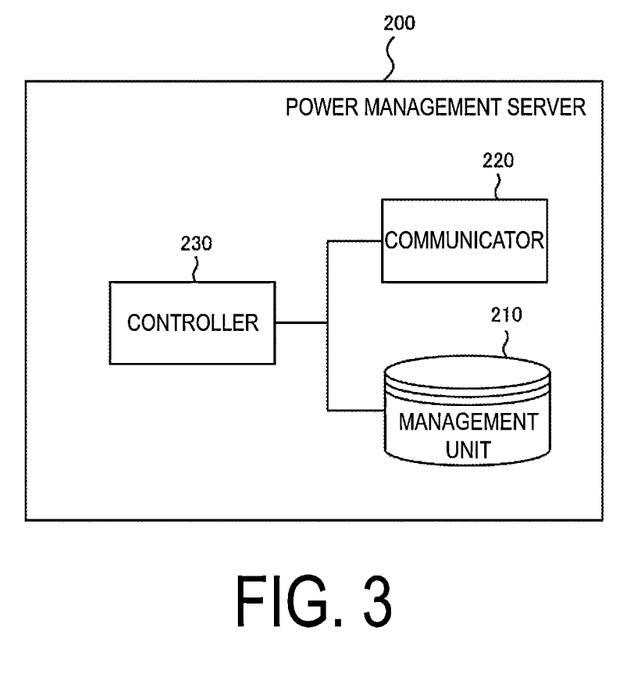
FIG. 3 is a diagram illustrating a power management server 200 according to the embodiment.

A power management server according to an embodiment will be described below. As illustrated in FIG. 3, the power management server 200 includes a management unit 210, a communicator 220, and a controller 230. The power management server 200 is an example of a virtual top node (VTN).

The management unit 210 includes a storage medium, such as a non-volatile memory and/or an HDD, and manages information on the facilities 300. For example, information relating to the facility 300 includes a type of the distributed power supply (the solar cell apparatus 310, the power storage apparatus 320, or the fuel cell apparatus 330) provided in the facility 300, specifications of the distributed power supply (the solar cell apparatus 310, the power storage apparatus 320, or the fuel cell apparatus 330) provided in the facility 300, and the like. The specifications may include a rated generated power of the solar cell apparatus 310, a rated power of the power storage apparatus 320, and a rated power of the fuel cell apparatus 330.

The communicator 220 includes a communication module, and communicates with the local controller 360 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the communicator 220 performs communication in accordance with the first protocol. For example, the communicator 220 transmits a first message to the local controller 360 in accordance with the first protocol. The communicator 220 receives the first message response from the local controller 360 in accordance with the first protocol.

The controller 230 may include at least one processor. The at least one processor may be configured of a single integrated circuit (IC) or a plurality of circuits (such as integrated circuits and/or discrete circuits) connected so as to be capable of communicating with each other.

The controller 230 controls each configuration provided in the power management server 200. For example, the controller 230 instructs the local controller 360 provided in the facility 300 to control the distributed power supply (the solar cell apparatus 310, the power storage apparatus 320, or the fuel cell apparatus 330) provided in the facility 300, by transmitting a control message. As described above, the control message may be a power flow control message, may be a reverse power flow control message, or may be a power supply control message.

Local Controller

Figure 4:
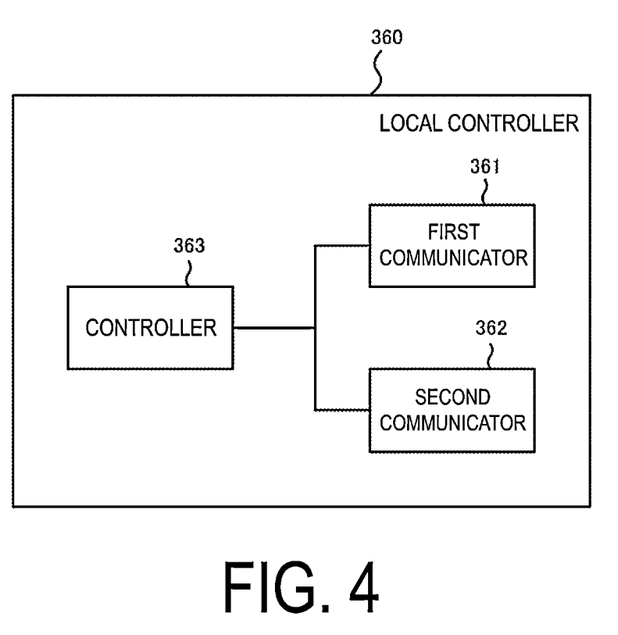
FIG. 4 is a diagram illustrating a local controller 360 according to the embodiment.

A local controller according to an embodiment will be described below. As illustrated in FIG. 4, the local controller 360 includes a first communicator 361, a second communicator 362, and a controller 363. The local controller 360 is an example of a virtual end node (VEN).

The first communicator 361 includes a communication module, and communicates with the power management server 200 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the first communicator 361 performs communication in accordance with the first protocol. For example, the first communicator 361 receives the first message from the power management server 200 in accordance with the first protocol. The first communicator 361 transmits the first message response to the power management server 200 in accordance with the first protocol.

The second communicator 362 includes a communication module, and communicates with the distributed power supply (the solar cell apparatus 310, the power storage apparatus 320, or the fuel cell apparatus 330). The communication module may be a wireless communication module compliant with standards such as IEEE 802.11a/b/g/n, ZigBee, Wi-SUN, and LTE, or may be a wired communication module compliant with standards such as IEEE 802.3.

As described above, the second communicator 362 performs communication in accordance with the second protocol. For example, the second communicator 362 transmits the second message to the distributed power supply in accordance with the second protocol. The second communicator 362 receives the second message response from the distributed power supply in accordance with the second protocol.

In the embodiment, the second communicator 362 constitutes a first receiver that receives at least information specifying the reverse power flow from the power meter 380. The second communicator 362 may receive information specifying the power flow from the power meter 380. The second communicator 362 constitutes a second receiver that receives information specifying each of the individual output powers of the two or more adjustment power supplies from each of the power meters 390.

The controller 363 may include at least one processor. The at least one processor may be configured of a single integrated circuit (IC) or a plurality of circuits (such as integrated circuits and/or discrete circuits) connected so as to be capable of communicating with each other.

The controller 363 controls each configuration provided in the local controller 360. Specifically, in order to control the power of the facility 300, the controller 363 instructs the device to set an operating state of the distributed power supply by transmitting the second message and receiving the second message response. In order to control the power of the facility 300, the controller 363 may instruct the distributed power supply to report information of the distributed power supply by transmitting the second message and receiving the second message response.

Equipment Management Server

Figure 5:
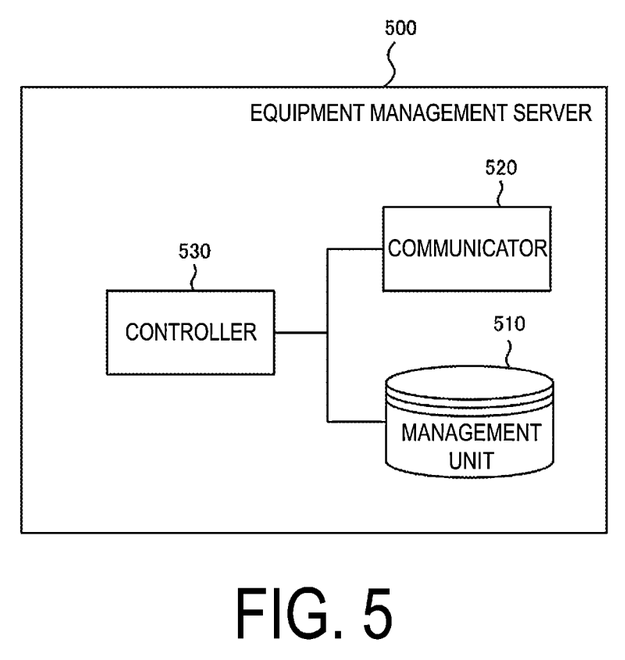
FIG. 5 is a diagram illustrating an equipment management server 500 according to the embodiment.

An equipment management server according to the embodiment will be described below. As illustrated in FIG. 5, the equipment management server 500 includes a management unit 510, a communicator 520, and a controller 530. The equipment management server 500 is an example of the virtual top node (VTN).

Figure 6:
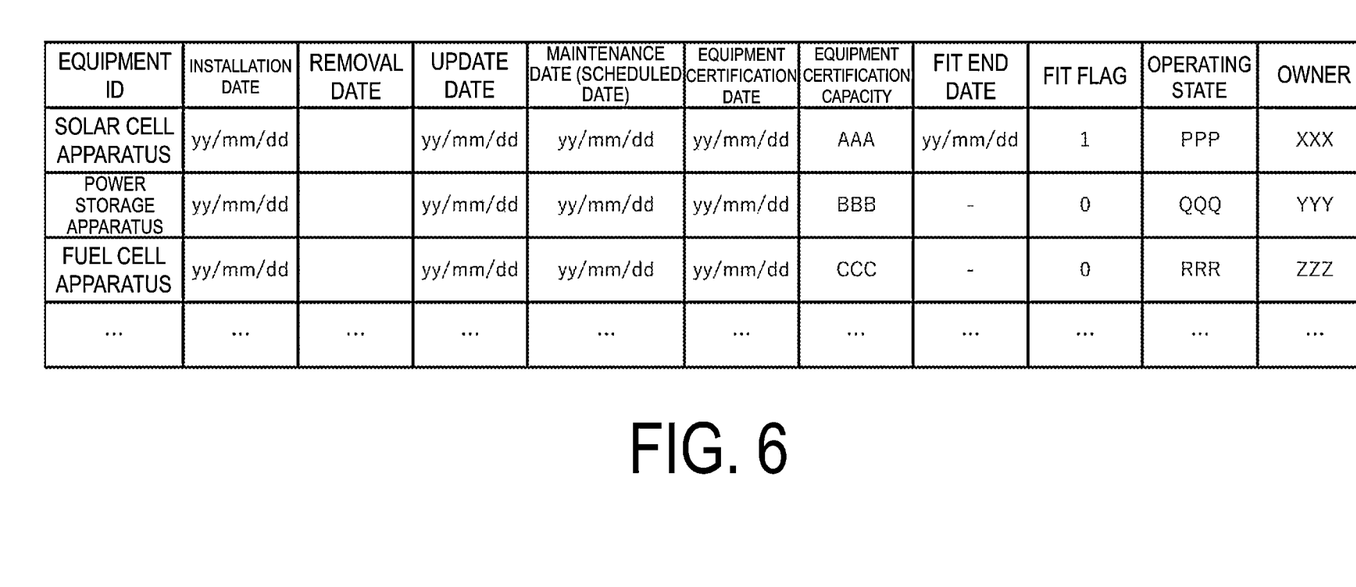
FIG. 6 is a diagram illustrating information managed by a management unit 510 according to the embodiment.

The management unit 510 includes the storage medium, such as the non-volatile memory and/or the HDD, and manages information on the adjustment power supply provided in the facility 300. In the embodiment, the information on the adjustment power supply includes at least an information element, and with this information element, the expiration timing of the period to which the feed-in tariff is applied can be specified. For example, as illustrated in FIG. 6, the information on the adjustment power supply includes an "equipment ID", an "installation date", a "removal date", an "update date", a "maintenance date", an "equipment certification date", an "equipment certification capacity", an "FIT end date", an "FIT flag", an "operating state", and an "owner".

The "equipment ID" is an information element specifying the adjustment power supply. The "equipment ID" may include an information element indicating a type of the adjustment power supply, or may include an information element such as a character string individually assigned to the adjustment power supply. In FIG. 6, the solar cell apparatus 310, the power storage apparatus 320, and the fuel cell apparatus 330 are exemplified as the adjustment power supplies.

The "installation date" is an information element specifying a date when the adjustment power supply was installed in the facility 300. The "installation date" may include an information element specifying a time when the adjustment power supply was installed in the facility 300.

The "removal date" is an information element specifying a removal date when the adjustment power supply was removed from the facility 300. The "removal date" may include an information element specifying the removal time when the adjustment power supply was removed from the facility 300.

The "update date" is an information element specifying a date when a firmware of the adjustment power supply was updated. The "update date" may include an information element specifying a time when a firmware of the adjustment power supply was updated.

The "maintenance date" is an information element specifying an implementation date when a maintenance of the adjustment power supply was performed or a scheduled date when the maintenance of the adjustment power supply is performed. The "maintenance date" may include an information element specifying an implementation time when the maintenance of the adjustment power supply was performed or a scheduled time when the maintenance of the adjustment power supply is performed.

The "equipment certification date" is an information element specifying a date when an equipment certification of the adjustment power supply was performed. The "equipment certification date" may include an information element specifying a time when the equipment certification of the adjustment power supply was performed. Here, the equipment certification refers to a certification of various items performed by a third party authority when the reverse power flow of the individual output power of the adjustment power supply is performed to the power grid 110. The various items include an installation position of the power meter that measures the individual output power, a measurement method of the individual output power, a capacity of the adjustment power supply, a measurement method of the power which is reversely flown from the adjustment power supply to the power grid 110. In a case where the feed-in tariff is applied to the adjustment power supply, the equipment certification date may be a date of receiving the certification for the application of the feed-in tariff.

The "equipment certification capacity" is an information element specifying a capacity of the adjustment power supply certified in the equipment certification. For example, in a case where the adjustment power supply is the solar cell apparatus 310, the equipment certification capacity of the solar cell apparatus 310 may include a capacity of the solar panel, or may include a capacity of the PCS. The equipment certification capacity of the solar cell apparatus 310 may be a smaller one of the capacity of the solar panel and the capacity of the PCS. In a case where the adjustment power supply is the power storage apparatus 320, the equipment certification capacity of the power storage apparatus 320 may include the capacity of the power storage cell, or may include the capacity of the PCS. The equipment certification capacity of the power storage apparatus 320 may be a smaller one of the capacity of the power storage cell and the capacity of the PCS. In a case where the adjustment power supply is the fuel cell apparatus 330, the equipment certification capacity of the fuel cell apparatus 330 may include the capacity of the fuel cell, or may include the capacity of the PCS. The equipment certification capacity of the fuel cell apparatus 330 may be a smaller one of the capacity of the fuel cell and the capacity of the PCS.

The "FIT end date" is an information element specifying an expiration date of the period to which the feed-in tariff is applied. The "FIT end date" may include an information element specifying an expiration time of the period to which the feed-in tariff is applied.

The FIT flag is a flag indicating whether the feed-in tariff is applied. The FIT flag may indicate whether the feed-in tariff is applied at the present time. Accordingly, in a case where the feed-in tariff is applied after the adjustment power supply is installed in the facility 300, the FIT flag may be changed. In FIG. 6, the FIT flag may take a value of "0" or "1". "0" indicates that the feed-in tariff is not applied, whereas "1" indicates that the feed-in tariff is applied.

The "operating state" is an information element indicating the operating state of each adjustment power supply. The operating state may include a transition of the individual output power of the adjustment power supply, or may include an operation mode of the adjustment power supply.

The "owner" is an information element indicating an owner of each adjustment power supply. The owner may be an owner of the facility 300. The owner may be a third party other than the owner of the facility 300 (so-called a third party ownership of the adjustment power supply).

The communicator 520 includes a communication module, and communicates with the local controller 360 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

In the embodiment, the communicator 520 transmits, to the power management server 200, a message including the information element with which the expiration timing of the period to which the feed-in tariff is applied can be specified. Here, a case will be exemplified in which the feed-in tariff is applied to the solar cell apparatus 310.

In such a case, most simply, the message may include the information element specifying the FIT end date, or may include the FIT flag. Alternatively, in a case where the period to which the feed-in tariff is applied is known, the message may include an information element specifying the equipment certification date of the solar cell apparatus 310.

In view of affecting the fluctuation of the reverse power flow output from the facility 300, the message may include an information element described below. Specifically, the message may include an information element specifying the equipment certification date of at least one of the power storage apparatus 320 and the fuel cell apparatus 330. The message may include an information element specifying the equipment certification capacity of the solar cell apparatus 310. The message may include an information element specifying the equipment certification capacity of at least one of the power storage apparatus 320 and the fuel cell apparatus 330.

The message may include an information element specifying the installation date of the adjustment power supply, or may include an information element specifying the removal date of the adjustment power supply.

The controller 530 may include at least one processor. The at least one processor may be configured of a single integrated circuit (IC) or a plurality of circuits (such as integrated circuits and/or discrete circuits) connected so as to be capable of communicating with each other.

The controller 530 controls each configuration provided in the equipment management server 500. For example, the controller 530 may instruct the communicator 520 to transmit the message described above at a predetermined timing.

The predetermined timing is one or more timings selected from a firmware update timing of the adjustment power supply, a maintenance timing of the adjustment power supply, a power failure recovery timing of the facility 300, an extension timing of the adjustment power supply, a removal timing of the adjustment power supply, and an owner change timing of the adjustment power supply. Here, the firmware update timing of the adjustment power supply, the maintenance timing of the adjustment power supply, the extension timing of the adjustment power supply, and the removal timing of the adjustment power supply can be specified with information managed by the management unit 510. The power failure recovery timing of the facility 300 may be detectable by the controller 530, or may be specified with the operating state managed by the management unit 510.

Power Management Method

A power management method according to the embodiment will be described below.

Figure 7:
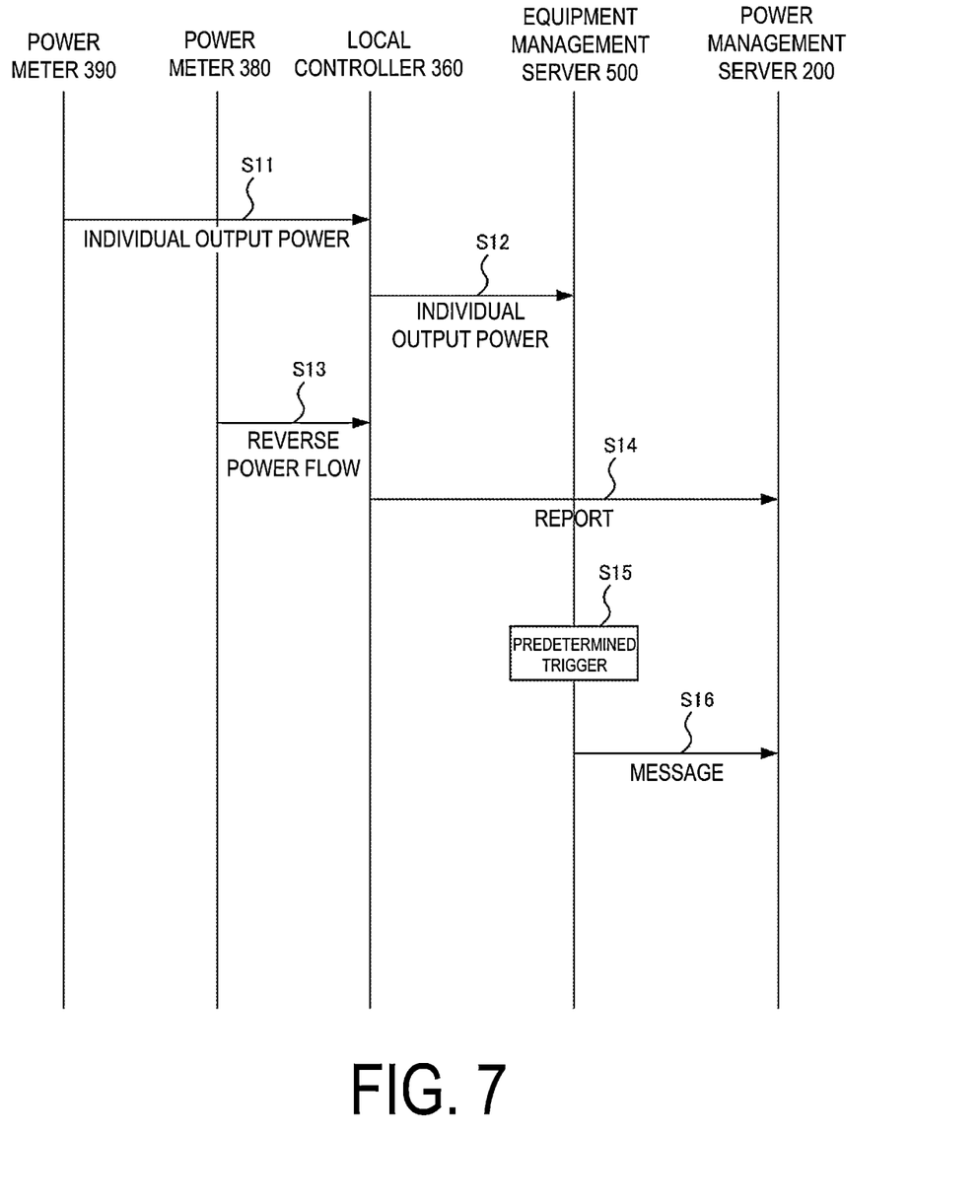
FIG. 7 is a diagram illustrating a power management method according to the embodiment.

As illustrated in FIG. 7, in step S11, the local controller 360 receives, from the power meter 390, a message including an information element indicating the individual output power of each adjustment power supply. The local controller 360 may receive the message at an interval (for example, 1 minute) shorter than the predetermined period.

In step S12, the local controller 360 transmits, to the equipment management server 500, a message including an information element indicating the individual output power of each adjustment power supply. The individual output power is an example of the operating state managed by the management unit 510.

In step S13, the local controller 360 receives, from the power meter 380, a message including an information element indicating the power flow or the reverse power flow. The local controller 360 may receive the message for each predetermined period.

In step S14, the local controller 360 transmits, to the power management server 200, a report including the information element indicating the power flow or the reverse power flow. The local controller 360 may transmit the report for each predetermined period. Here, the report may include an information element specifying the output power of each adjustment power supply that contributes to the reverse power flow.

In step S15, the equipment management server 500 detects a predetermined trigger. As described above, the predetermined trigger is one or more timings selected from the firmware update timing of the adjustment power supply, the maintenance timing of the adjustment power supply, the power failure recovery timing of the facility 300, the extension timing of the adjustment power supply, the removal timing of the adjustment power supply, and the owner change timing of the adjustment power supply.

In step S16, the equipment management server 500 transmits, to the power management server 200, the message including the information element, and with this information element, the expiration timing of the period to which the feed-in tariff is applied can be specified. The message may include an information element specifying the FIT end date, or may include the FIT flag. The message may include an information element specifying the equipment certification date of the solar cell apparatus 310. As described above, in view of affecting the fluctuation of the reverse power flow output from the facility 300, the message may include other various information elements.

Actions and Effects

In the embodiment, the equipment management server 500 transmits, to the power management server 200, the message including the information element and with this information element, the expiration timing of the period to which the feed-in tariff is applied can be specified. According to such a configuration, the power management server 200 can predict the possibility of the fluctuation of the reverse power flow output from the facility 300 by recognizing the period to which the feed-in tariff is applied. Accordingly, prediction accuracy of the fluctuation of the reverse power flow output from the facility 300 is improved.

Other Embodiments

Although the present disclosure has been described by the above-described embodiment, it should be understood that the description and the drawings which form a part of this disclosure do not limit this disclosure. Various alternative embodiments, examples, and operational techniques will be apparent from this disclosure to those skilled in the art.

In the embodiment, the case has been exemplified in which the equipment management apparatus that manages the adjustment power supply is the equipment management server 500. However, the embodiment is not limited to this example. The equipment management apparatus may be the local controller 360. In such a case, the management unit 510 described above may be provided in the local controller 360.

In the embodiment, the solar cell apparatus 310 has been exemplified as the adjustment power supply that outputs power by utilizing natural energy. However, the embodiment is not limited to this example. The adjustment power supply that outputs power by utilizing natural energy may include one or more adjustment power supplies selected from a wind power generation apparatus, a water power generation apparatus, a geothermal power generation apparatus, and the biomass power generation apparatus.

In the embodiment, the case has been exemplified in which each adjustment power supply includes an individual PCS. However, the embodiment is not limited to this example. One multi-DC link PCS may be provided for the two or more adjustment power supplies.

In an embodiment, the case has been exemplified in which the local controller 360 is provided in the facility 300. However, the embodiment is not limited to this example. The local controller 360 may be provided by a cloud service.

Although not specifically mentioned in the embodiment, the electric power may be an instantaneous value (kW) or an integrated value per unit time (kWh).

Note that the contents of JP 2019-175737 (filed on Sep. 26, 2019) are incorporated herein by reference in its entirety.

The invention claimed is:

1. A power management system comprising a facility comprising an adjustment power supply to which feed-in tariff is applied, the power management system comprising:
   an equipment management apparatus configured to manage the adjustment power supply; and
   a power management server configured to manage a reverse power flow output from the facility to a power grid, wherein
   the equipment management apparatus comprises a transmitter configured to transmit, to the power management server, a message comprising an information element with which an expiration timing of a period to which the feed-in tariff is applied is allowed to be specified, and
   the information element comprises at least any one of
      (i) an information element specifying an equipment certification date of the adjustment power supply,
      (ii) an information element specifying an equipment certification date of at least one of a power storage apparatus or a fuel cell apparatus provided in the facility,
      (iii) an information element specifying an equipment certification capacity of the adjustment power supply, or
      (iv) an information element specifying an equipment certification capacity of at least one of the power storage apparatus or the fuel cell apparatus provided in the facility.

2. The power management system according to claim 1, wherein
   the information element comprises an information element specifying an expiration date of a period to which the feed-in tariff is applied.

3. The power management system according to claim 1, wherein
   the information element comprises a flag indicating whether the feed-in tariff is applied.

4. The power management system according to claim 1, wherein
   the transmitter periodically transmits the message to the power management server.

5. The power management system according to claim 1, wherein
   the transmitter transmits the message to the power management server at a predetermined timing,
   the predetermined timing is one or more timings selected from a firmware update timing of the adjustment power supply, a maintenance timing of the adjustment power supply, a power failure recovery timing of the facility, an extension timing of the adjustment power supply, a removal timing of the adjustment power supply, and an owner change timing of the adjustment power supply.

6. A power management method in a power management system comprising a facility with an adjustment power supply to which feed-in tariff is applied, the power management method comprising:
   transmitting, by an equipment management apparatus configured to manage the adjustment power supply, to a power management server configured to manage a reverse power flow output from the facility to a power grid, a message comprising an information element with which an expiration timing of a period to which the feed-in tariff is applied is allowed to be specified, wherein
   the information element comprises at least any one of
      (i) an information element specifying an equipment certification date of the adjustment power supply,
      (ii) an information element specifying an equipment certification date of at least one of a power storage apparatus or a fuel cell apparatus provided in the facility,
      (iii) an information element specifying an equipment certification capacity of the adjustment power supply, or
      (iv) an information element specifying an equipment certification capacity of at least one of the power storage apparatus or the fuel cell apparatus provided in the facility.

* * * * *